Patented June 8, 1954

2,680,739

UNITED STATES PATENT OFFICE 2,680,739

PRODUCTION OF SODIUM PENICILLIN

Leon Goldman, Nyack, N. Y., assignor to American Cyanamid Company, New York, N. Y., a corporation of Maine No Drawing. Application April 22, 1948, Serial No. 22,710

7 Claims. (Cl. 260—239.1)

This invention relates to a method of preparing pure sodium salts of penicillin.

Pure sodium penicillin in crystalline form has become an important product in modern medicine, and commercial methods of producing the pure salt are necessary. Unfortunately, methods of obtaining crystals of pure sodium penicillin, particularly benzylpenicillin, commonly known as penicillin G, are not entirely satisfactory for various reasons. The process of the present invention which will be described herein provides a quick and easy method of obtaining pure crystals of sodium penicillin in good yields under conditions which largely avoid loss of the therapeutic activity of the penicillin during the process steps. In its essence the process involves the conversion of a trialkylammonium salt of penicillin, such as triethylammonium penicillin which can be obtained in good yield by known processes, to pure sodium penicillin by treatment of the trialkylammonium penicillin with sodium iodide. As will be seen from the specific examples which follow, the colorless crystals of sodium penicillin are obtained directly and immediately in excellent yields under conditions which avoid unnecessary loss of penicillin through the destructive action of the medium.

In carrying out the process of the present invention a solution of triethylammonium penicillin in a substantially anhydrous polar solvent is prepared. Methods of obtaining such solutions are known to those skilled in the art, and it is sufficient to say that such solutions can be prepared by simply dissolving the triethylammonium salt of penicillin in a suitable solvent. Such solutions can also be obtained by extracting an aqueous solution containing triethylammonium penicillin with a water immiscible polar solvent.

The solution of triethylammonium penicillin should contain as much of the penicillin salt as possible and should be substantially anhydrous. Ethyl alcohol and chloroform have been found particularly satisfactory as polar solvents. But any substantially anhydrous neutral polar organic solvent which is non-reactive with penicillin can be employed. The solution may contain from about 25,000 to 400,000 Oxford units of penicillin per milliliter. The triethylammonium penicillin salt used in the process need not be of an especially high degree of purity, although, obviously, the fewer impurities in the solution the purer will be the final sodium salt.

It is one of the advantages of the process that it may be carried out at room temperature. Of course, if desired, lower temperatures down to about 0° C. or temperatures as high as about 35° C. can be used. Inasmuch as there are no strongly acid or alkaline substances present, practically no destruction of penicillin occurs during the process, even at room temperature.

To convert the triethylammonium penicillin to crystals of pure sodium penicillin it is merely necessary to add to the solution of triethylammonium penicillin in alcohol or chloroform or any polar organic solvent, sodium iodide. This latter substance is added preferably dissolved in a solvent which is miscible with alcohol or chloroform, in which the sodium iodide is moderately soluble, and which does not possess too great solvent powers for sodium penicillin. Acetone and ethyl alcohol are among such solvents. These solvents are essentially anhydrous but may contain a small amount of water, say about 5%. While the presence of water tends to have a solvent action on the penicillin and lower the yield, yet a small amount of water seems to result in a slightly purer product. The term "substantially anhydrous" therefore as used hereinafter is intended to include those solvents having a few per cent of water, up to about 5% by volume.

The sodium iodide is dissolved in either acetone or ethyl alcohol or mixtures thereof to form a concentrated solution, approximately 5% to 15% by weight in acetone or alcohol, more or less, and the solution is then added to the triethylammonium penicillin solution in such quantity that there is at least a molecular excess of sodium iodide based on the triethylammonium penicillin present therein. Usually I prefer approximately a 25% molecular excess of sodium iodide, although, obviously, more or less can be used if desired. As a result of merely mixing the sodium iodide solution with the triethylammonium penicillin solution there is formed sodium penicillin which precipitates from the mixed solutions in the form of colorless crystals of high purity and in good yields. The sodium penicillin may be recovered therefrom by simple filtration, after which the crystals can be washed with alcohol or other solvent in which sodium penicillin has a low solubility. The mother liquor can, of course, be reworked, and the penicillin contained therein recovered almost completely.

To illustrate the invention in greater particularity the following examples are given:

Example 1

To a solution of 10 g. of triethylammonium penicillin, assaying 1,330 u./mg., in 250 ml. of anhydrous ethanol was added a solution of 5 g. of sodium iodide in 25 ml. of anhydrous ethanol. The resulting mixture was chilled in an ice bath and crystals formed. The colorless crystals were removed by filtration, washed with 3 portions of 15 ml. each of anhydrous ethanol, and dried in vacuo. The yield of crystalline sodium penicillin was 2.31 g., assaying 1,600 u./mg. and 93% G by weight.

*Example 2*

To a solution of 5 g. of triethylammonium penicillin, assaying 1,350 u./mg., in 30 ml. of chloroform was added a solution of 3.5 g. of sodium iodide in 40 ml. of anhydrous ethanol. Colorless crystals immediately formed and were removed by filtration, washed three times with 6 ml. of cold anhydrous ethanol, and dried in vacuo. The yield of crystalline sodium penicillin was 3.09 g., assaying 1,590 u./mg.

*Example 3*

To a solution of 10 g. of triethylammonium penicillin, assaying 1,350 u./mg., in 50 ml. of chloroform was added 7 g. of sodium iodide in 50 ml. of acetone. Immediate crystalization occurred, and after being chilled for 2 hours, the crystals were removed by filtration, washed with 5 ml. of cold anhydrous ethanol three times, and dried in vacuo. The yield of colorless crystalline sodium penicillin was 7.91 g., assaying 1,460 u./mg.

Obviously, variations in the procedure are possible and may be made by those skilled in the art without departing from the essential features of the invention as defined in the appended claims.

I claim:

1. A method of obtaining crystalline sodium penicillin which comprises adding sodium iodide to a substantially anhydrous solution of a trialkylamine salt of penicillin in a polar organic solvent and recovering the sodium penicillin which is formed.

2. A method which comprises adding a solution of sodium iodide in a substantially anhydrous solvent to a solution of triethylammonium penicillin in a substantially anhydrous polar solvent and recovering the crystals of sodium penicillin which form.

3. A method which comprises adding a solution of sodium iodide in a solvent therefor of the group consisting of acetone and ethyl alcohol to a solution of triethylammonium penicillin in a polar solvent therefor of the group consisting of ethyl alcohol and chloroform and recovering therefrom the sodium penicillin which forms.

4. A method of preparing pure crystalline sodium penicillin G which comprises the steps of adding a solution containing approximately 5% to 15% by weight sodium iodide in acetone to a concentrated solution of triethylammonium penicillin G in chloroform and recovering therefrom the crystals of sodium penicillin G which form.

5. A method of obtaining pure crystalline sodium penicillin G which comprises the steps of adding a solution of approximately 5% to 15% by weight of sodium iodide in ethyl alcohol to a concentrated solution of triethylammonium penicillin in chloroform and recovering therefrom the crystals of sodium penicillin G which form.

6. A method of preparing pure crystalline sodium penicillin G which comprises adding a concentrated solution of sodium iodide in ethyl alcohol to a concentrated solution of triethylammonium penicillin in ethyl alcohol and thereafter recovering the crystalline sodium penicillin G which forms.

7. Process for the formation of sodium penicillin which comprises metathetically reacting triethyl amine salt of penicillin with sodium iodide in a lower alkanol solution.

References Cited in the file of this patent

"Abraham et al., "The British Journal of Expt'l Path.," vol. 23, June 1942, page 113.

Heyden Report CMR–H–4 June 15, 1944, page 2.

Merck Report CMR–M–77 September 28, 1945, pages 1–3.